(12) United States Patent  
Louis

(10) Patent No.: US 8,205,559 B2  
(45) Date of Patent: Jun. 26, 2012

(54) SELF-RIGHTING, TWO-WHEEL PIPE CRAWLER

(75) Inventor: James Louis, Chicago, IL (US)

(73) Assignee: Gas Technology Institute, Des Plaines, IL (US)

( * ) Notice: Subject to any disclaimer, the term of this patent is extended or adjusted under 35 U.S.C. 154(b) by 316 days.

(21) Appl. No.: 12/569,995

(22) Filed: Sep. 30, 2009

(65) Prior Publication Data

US 2011/0073001 A1    Mar. 31, 2011

(51) Int. Cl.  
*B61B 13/00* (2006.01)
(52) U.S. Cl. .................................................. 104/138.2
(58) Field of Classification Search ............... 104/138.1, 104/138.2; 73/865.8, 623; 356/241.1, 241.4, 356/241.6; 15/104.05; 378/60; 382/141; 396/19; 324/220; 254/134.5; 376/249; 318/568.12  
See application file for complete search history.

(56) References Cited

U.S. PATENT DOCUMENTS

| | | | | |
|---|---|---|---|---|
| 5,142,990 A | * | 9/1992 | Leonard | 104/138.2 |
| 6,123,027 A | * | 9/2000 | Suyama et al. | 104/138.2 |
| 7,343,863 B2 | | 3/2008 | Louis | |

FOREIGN PATENT DOCUMENTS

JP            5-294234        * 11/1993

\* cited by examiner

*Primary Examiner* — Mark Le  
(74) *Attorney, Agent, or Firm* — Mark E. Fejer

(57) ABSTRACT

An apparatus for transporting a payload along the inside of a substantially horizontal pipe, which apparatus includes a pair of spaced apart, vertically aligned, relationally pivotably connected, rollable pipe tracking contactors, wherein pivoting of one of the pipe tracking contactors in a first direction results in pivoting of the other pipe tracking contactor in a direction opposite to the first direction. The apparatus further includes a control system which is used to maintain the vertical alignment of the pipe tracking contactors and which includes a two-dimensional tilt sensor that provides information to a controller regarding the orientation of the apparatus. Using the information from the sensor, the controller is able to correct both the lateral position and the speed of the contactors to bring the apparatus back into vertical alignment.

19 Claims, 5 Drawing Sheets

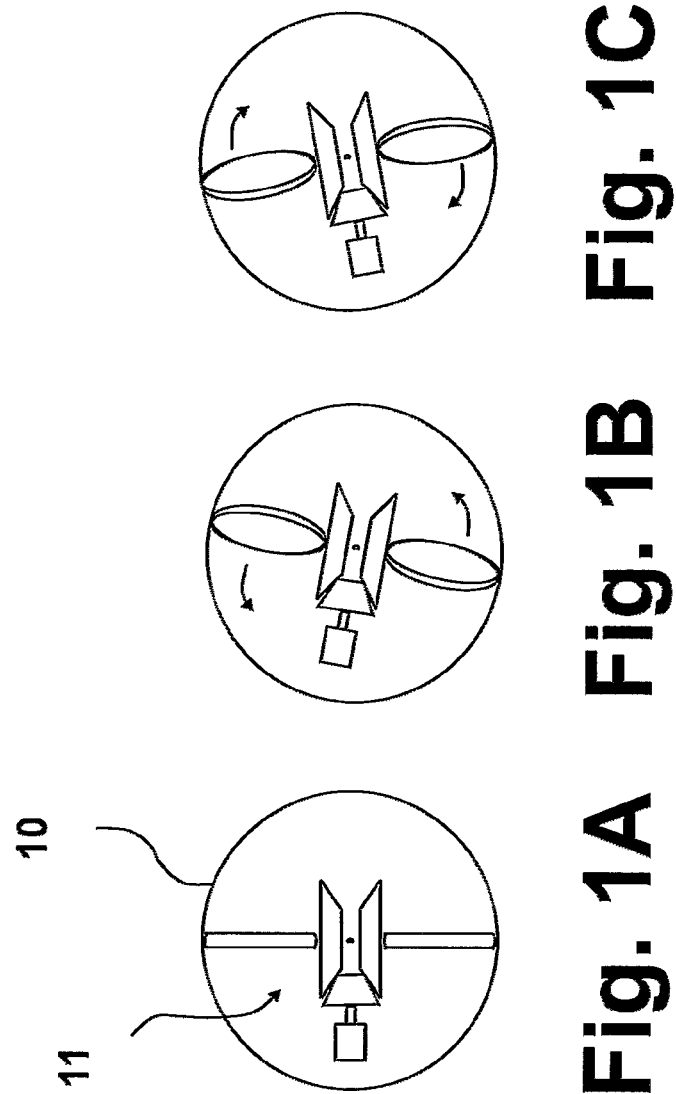

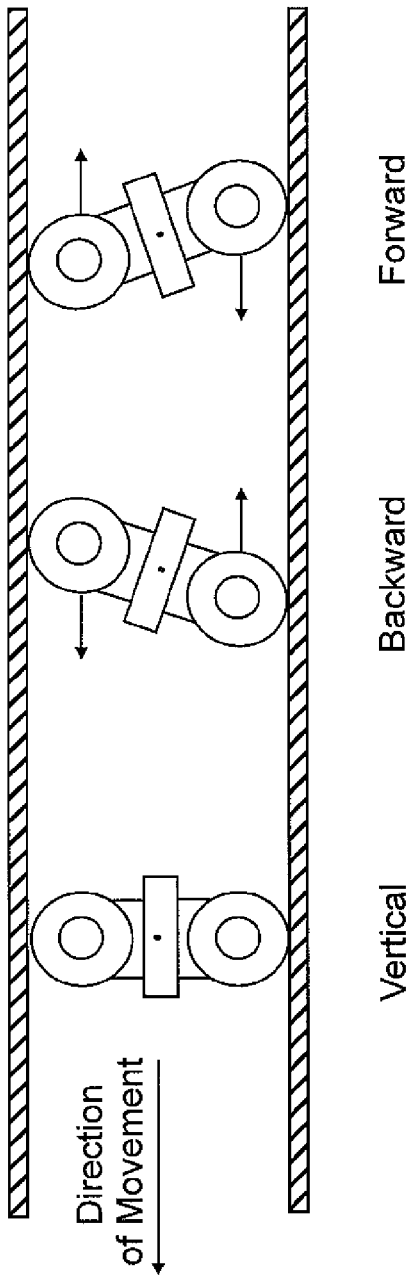

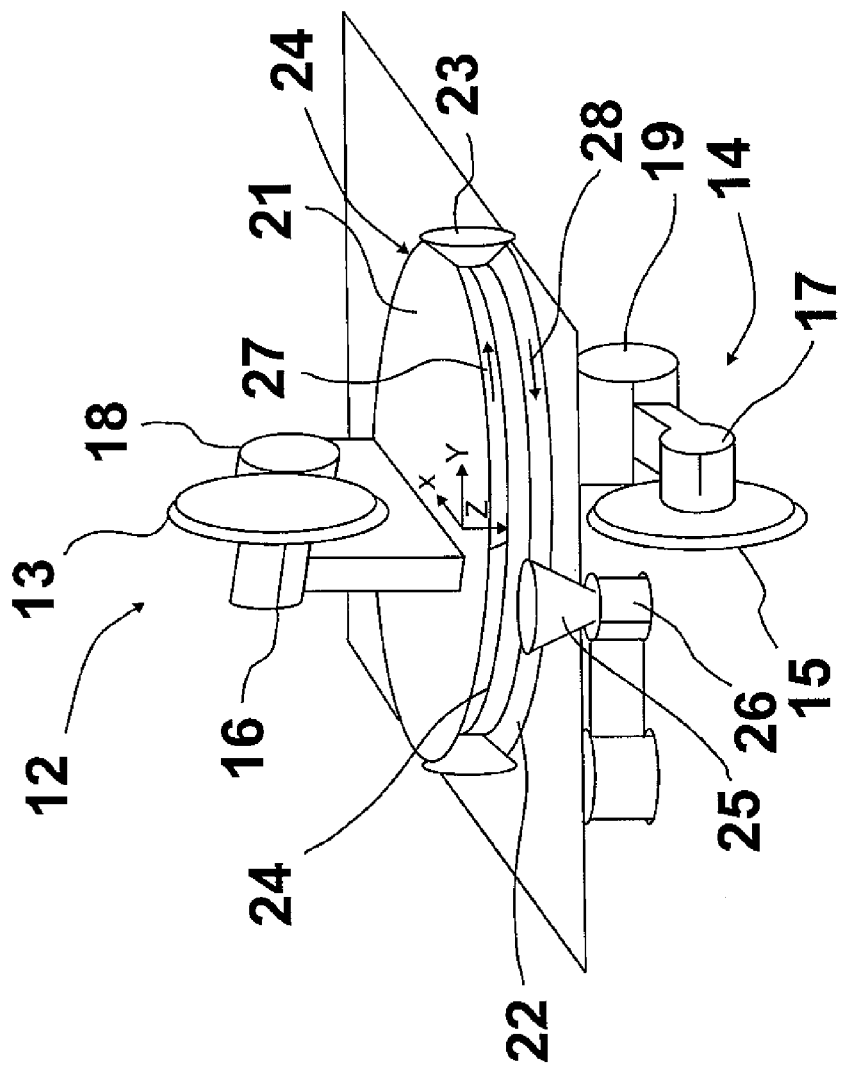

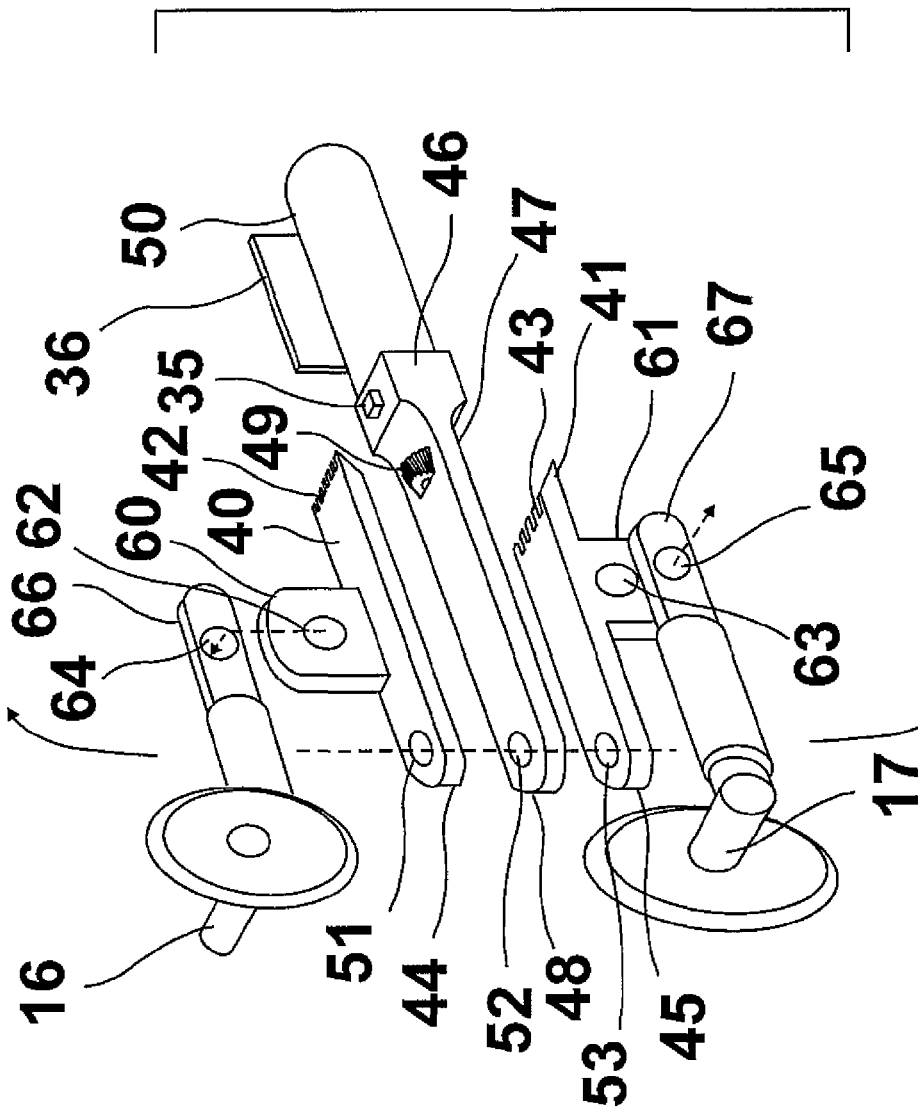

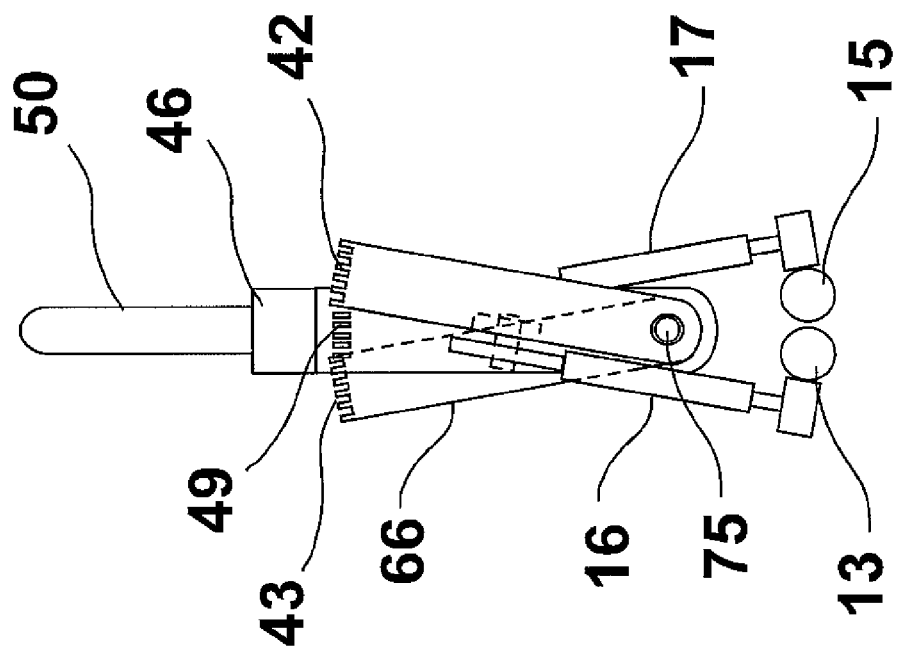
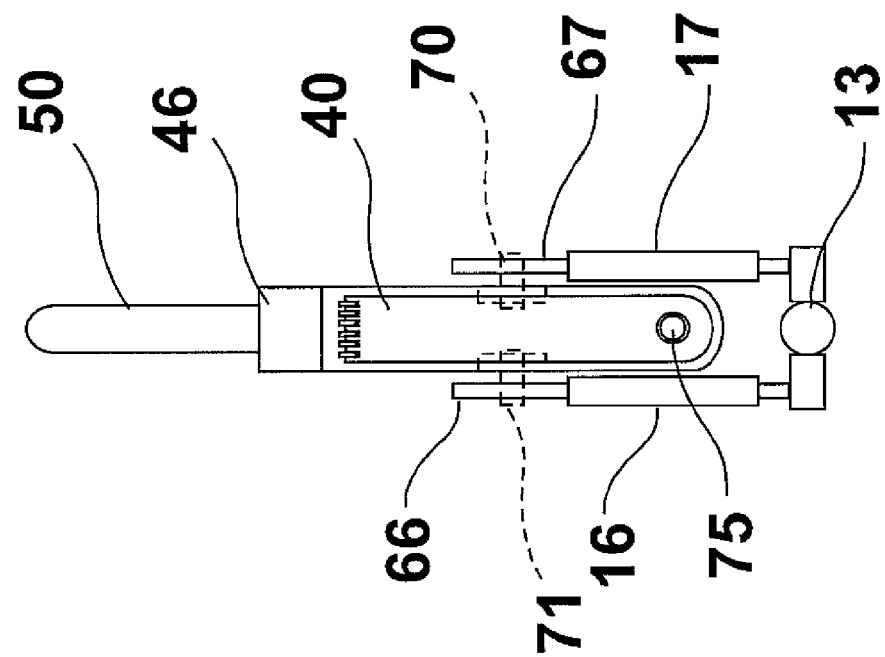

SELF-RIGHTING, TWO-WHEEL PIPE CRAWLER

BACKGROUND OF THE INVENTION

1. Field of the Invention

This invention relates to an apparatus for steering or otherwise guiding a payload through the inside of a substantially horizontal pipe. More particularly, this invention relates to an apparatus for transporting instrumentation or other equipment for internal inspection, maintenance and/or repair of an underground pipe, such as a utility pipeline, which apparatus automatically maintains a substantially vertical orientation within the pipe as it moves through the pipe. Typically, the payload is mounted to a support that is pulled or pushed or otherwise motivated along the centerline of the pipe.

2. Description of Related Art

Internal inspection, maintenance and repair of underground utility pipelines is frequently utilized to avoid expensive excavation of the ground surrounding the pipeline. In addition to being expensive, excavation offers the potential for damage to the pipeline resulting, for example, from contact with the excavation equipment.

Tools for internal pipeline inspection perform a wide variety of specific functions, such as geometric surveys, determination of metal loss, and detection of cracks or leaks. Conventional means for transporting such payloads through the inside of the pipeline have a tendency to tip or otherwise spiral within the pipeline as they travel along the pipeline. To provide the accuracy required for internal pipeline inspection, it is important to be able to maintain a fixed radial orientation while traveling through the pipe. Any imbalance in the conveyance apparatus seen by the payload can cause it to ride up the pipe wall. This, in turn, can cause the payload carriage to spiral as it moves through the pipe and, in some instances, may even cause the payload carriage to become immobilized if it flips over. This spiraling is avoided by ensuring that the payload carriage follows the "valley" or lowest point of the pipe interior as it travels through the pipe.

U.S. Pat. No. 7,343,863, (the '863 patent) which is incorporated by reference herein in its entirety, teaches an apparatus for transporting a payload inside a pipeline which addresses this spiraling issue. The apparatus comprises vertically aligned upper and lower roller elements which are relationally pivotably connected with each other and which contact the inside surface of the pipe into which the apparatus is inserted. The apparatus further comprises a steering pendulum which enables the apparatus to maintain a substantially vertical orientation as it is pushed or pulled through the pipe. However, operation of the apparatus requires the use of two apparatus units connected together, a front apparatus unit and a back apparatus unit, to avoid forward or backward tipping over of the apparatus.

SUMMARY OF THE INVENTION

It is, therefore, one object of this invention to provide a single unit apparatus for transporting a payload through the inside of a substantially horizontal pipe which is automatically able to avoid spiraling within the pipe and tipping in the forward or backward direction as it travels through the pipe.

This and other objects of this invention are addressed by an apparatus for transporting a payload along the inside of a substantially horizontal pipe comprising vertically aligned upper and lower rollable pipe tracking contactors which are relationally pivotably connected with each other such that pivoting of the lower pipe tracking contactor in one direction will result in pivoting of the upper pipe tracking contactor in the opposite direction. The apparatus further comprises two-dimensional vertical stabilization means for maintaining the spaced apart upper and lower pipe tracking contactors in a substantially vertical alignment as the apparatus travels through the pipe. As used herein, the term "pipe tracking contactor" refers to an element which is in contact with the inside surface of the substantially horizontal pipe as the apparatus travels through the pipe.

BRIEF DESCRIPTION OF THE DRAWINGS

These and other objects and features of this invention will be better understood from the following detailed description taken in conjunction with the drawings, wherein:

FIG. 1A, 1B, 1C, each is an axial view of a pipe containing an apparatus for transporting payloads in the pipe and showing the effect of spiraling of the apparatus;

FIG. 2 is a lateral view of a pipe containing an apparatus for transporting payloads in the pipe and showing the effect of tipping of the apparatus in the forward or backward direction;

FIG. 3 is a perspective view of an apparatus for transporting payloads in a pipe in accordance with another embodiment of this invention FIG. 4 is a perspective exploded view of an apparatus for transporting payloads in a pipe in accordance with one embodiment of this invention;

FIG. 5 is a topdown view of the apparatus of FIG. 4 except that the wheel contactors have been replaced with ball contactors; and FIG. 6 is a topdown view of the apparatus of FIG. 5 showing the relative movement of the components of the apparatus.

DETAILED DESCRIPTION OF THE PRESENTLY PREFERRED EMBODIMENTS

The invention described herein is a self-righting, two-wheel pipe crawler for transporting payloads along the inside of a pipe. The apparatus may be tethered for control and retrieval of the apparatus inside the pipe. However, tethering of the apparatus results in certain limitations on the mobility of the apparatus in the pipe. Alternatively, the apparatus may be untethered, providing greater freedom of mobility of the apparatus in the pipe, but also possibly making retrieval of the apparatus from the pipe more difficult in the event of an unforeseen occurrence affecting the apparatus. The apparatus requires some form of power to operate, such as a battery in the absence of a tether or direct input from an external source through a tether.

As previously indicated, in order that internal inspection of a pipe provide meaningful results, it is essential that the inspection tool, i.e. the payload, be maintained in a fixed radial orientation while traveling through the pipe. FIG. 1 shows an axial view of a pipe 10 containing an apparatus 11 in accordance with one embodiment of this invention and showing possible lateral orientations of the apparatus as it travels through the pipe. The desired orientation of the apparatus, shown in FIG. 1(a), is one in which the apparatus is maintained in a substantially vertical orientation. Thus, an object of this invention is to return the apparatus to a vertical orientation should it begin to tilt radially as shown in FIGS. 1(b) and 1(c). If left uncorrected, the apparatus will continue to rotate or move in a radial direction around the longitudinal axis of the pipe as it travels through the pipe, producing a helical or spiral path. This object is addressed by embodiments of the apparatus of this invention shown in FIGS. 3-6.

In addition to the avoidance of spiraling, it is one object of this invention to provide an apparatus in which tipping in the forward or backward direction as shown in FIG. 2 is avoided. As used herein, the terms "forward" and "backward" refer to the direction of travel of the apparatus along the longitudinal axis of the pipe. Tipping is typically the result of one or the other pipe tracking contactors moving faster than the other pipe tracking contactor. Thus, the capability of returning a forward or backward tipping to an upright position is achieved by adjustment of the speeds of forward rotation of the contactors.

The apparatus of this invention comprises an upper pipe tracking contactor assembly 12 comprising an upper rollable pipe tracking contactor 13 a lower pipe tracking contactor assembly 14 comprising a rollable lower pipe tracking contactor 15 vertically spaced apart from the rollable upper pipe tracking contactor. Suitable rollable pipe tracking contactors are wheels and balls. The apparatus further comprises two-dimensional stabilization means for maintaining the upper and lower pipe tracking contactors in a vertical alignment. Such two-dimensional stabilization means comprises a relational pivot means for pivotably connecting the upper and lower pipe tracking contactor assemblies in a manner such that, if one of the rollable contactors pivots in one direction, the other contactor pivots in the opposite direction, and in so doing, returns the apparatus to the desired vertical orientation in which the rollable upper and lower pipe tracking contactors are vertically aligned. In accordance with one embodiment of this invention, at least one of the upper and lower pipe tracking contactor assemblies comprises a variable speed contactor motor 16, 17 operably connected with the respective pipe tracking contactor 13, 15 for rotating the contactor. The use of at least one contactor motor enables the apparatus to travel untethered through the pipe, if desired. For purposes of providing greater stability and control, the use of a contactor motor connected with each of the contactors is preferred. In addition to the rollable contactors and contactor motors, each pipe tracking contactor assembly further comprises connection means 18, 19 for vertically pivotably connecting the assembly to the aforementioned relational pivot means.

In accordance with one embodiment of this invention, the relational pivot means comprises at least one bevel gear assembly 20 aligned to provide relational pivoting of the upper and lower pipe tracking contactors, whereby pivoting of one of the pipe contactors in a first direction results in pivoting of the other pipe tracking contactor in a direction opposite to the first direction. In accordance with one embodiment of this invention, the at least one bevel gear assembly comprises a passive upper gear wheel 21, a passive lower gear wheel 22, and at least one slave bevel gear 23 engaging the upper and lower wheel gears. Disposed between the upper and lower passive wheel gears is an intermediate connecting element 24 connecting the upper and lower passive wheel gears 21, 22. In accordance with one embodiment of this invention, the intermediate connecting element is a thrust bearing. In addition to the passive wheel gears and the slave bevel gear, the bevel gear assembly further comprises a drive bevel gear 25 which engages the lower wheel gear 22 and which is driven by a motor 26. Thus, as the drive bevel gear rotates, the lower passive wheel gear rotates in one direction as indicated by arrow 28 and, by means of the at least one slave bevel gear 23, the upper passive wheel gear 21 rotates in the opposite direction as indicated by arrow 27. And, because the pipe tracking contactors 13, 15 are connected with the upper and lower passive wheel gears 21, 22, respectively, the contactors are able to be pivoted to a vertical alignment in the event that the apparatus begins to tilt radially.

As previously indicated, successful transport of a payload using the apparatus of the '863 patent requires the use of two apparatus units connected together, one in front of the other. As size can be a factor limiting the use of a given apparatus in smaller diameter pipes, it is desirable that the apparatus be as small or compact as possible. Thus, the ability to reduce the number of apparatus units required to operate the apparatus of the '863 patent to a single apparatus is highly desirable. However, as will be appreciated by those versed in the art, with only two pipe tracking contactors, it is possible that, in addition to tilting radially, the apparatus may also tip in a forward or backward direction, resulting in the apparatus falling completely forward or backward. Forward or backward tilting of the apparatus typically occurs as a result of differences in the speed of the upper and lower pipe tracking contactors. This issue is addressed in the apparatus of this invention by the two-dimensional stabilization means for maintaining the upper and lower pipe tracking contactors in a substantially vertical alignment, which further comprises at least one two-dimensional tilt sensor 35 (FIG. 4) mounted on the apparatus to sense deviations of the upper and lower pipe tracking contactors from vertical alignment. The tilt sensor is operably connected with a controller 36 which, when operating in an untethered mode, is mounted on the apparatus. When operating in a tethered mode, the controller may be mounted on the apparatus or, alternatively, may be at the end of the tether distal from the apparatus, where the tether acts as a communication means for communicating between the apparatus and the controller. As previously indicated, at least one of the upper and lower pipe tracking contactor assemblies comprises a variable speed contactor motor operably connected with the associated rollable pipe tracking contactor. The controller is operably connected with at least one of the variable speed motors by which the speeds of the contactors may be adjusted in response to an indication that the apparatus is tilting forward or backward.

One of the requirements for proper functioning of the apparatus of this invention is that contact between the pipe tracking contactors and the inside surface of the pipe be maintained at all times. Accordingly, in accordance with one embodiment of this invention, the apparatus further comprises force means for applying a force to each contactor to maintain continuous contact between the pipe and the contactors. In accordance with one embodiment of this invention, the connection means for vertically pivotably connecting the upper and lower pipe tracking contactor assemblies with the aforementioned relational pivot means comprises a spring-loaded connection by which a constant force is applied in a direction of the pipe to each of the pipe tracking contactors so as to maintain continuous contact between the pipe tracking contactors and the pipe.

As earlier indicated, the size of an apparatus for transporting a payload through a pipe is a key element affecting the usefulness of the apparatus. Accordingly, the smaller the apparatus is, the more useful it is. FIGS. 4, 5, and 6 show one particularly preferred embodiment of this invention, which reduces the apparatus of this invention to a relatively small size. This is achieved by reducing the wheel gears of the embodiments previously described to wheel gear segments 40, 41 having a gear end 42, 43 and a pivot end 44, 45. Disposed between the wheel gear segments is an intermediate connecting element segment 46 having a bevel gear end 47 and a pivot end 48. Disposed at the bevel gear end is a bevel gear 49 operably connected with a reversible bevel gear motor 50, enabling the bevel gear to be rotated in either direction depending on the direction of radial tilt to bring the upper and lower pipe tracking contactors into vertical alignment. Each of the wheel gear segments and the connecting element are provided with a pivot point which are vertically aligned around which the pivot ends are able to pivot. It will be appreciated by those versed in the art that there are numerous ways in which the pivoting may be achieved. In accordance with one embodiment, each of the pivot ends forms a pivot opening 51, 52, 53 adapted to receive a pivot element for relative pivoting of each of the wheel gear segments and the intermediate connecting element. In accordance with one embodiment of this invention, the pivot element is a pin 75 (FIG. 5) extending through each of the pivot openings. In accordance with another embodiment of this invention, the pivot element is a thrust bearing. As shown in FIGS. 4 and 5, each of the pipe tracking assemblies 40, 41 is connected with one of the wheel gear segments. Each of the wheel gear segments comprises a vertically extending protrusion 60, 61 which forms an opening 62, 63 which is aligned with pivot openings 64, 65 of the elongated attachment elements 66, 67 of the pipe tracking assemblies. The pipe tracking contactor assemblies are rotatably connected with the vertically extending protrusions 60, 61 by pins 70, 71 as shown in FIG. 5. As previously described, the connection means for vertically pivotably connecting the assembly to the wheel gear segments includes a means by which a vertical acting force is applied to the pipe tracking contactors to maintain contact between the contactors and the pipe. In accordance with one embodiment, the connection means comprises a suitably oriented spring by way of which the vertical acting force is applied to the contactors.

While in the foregoing specification this invention has been described in relation to certain preferred embodiments thereof, and many details have been set forth for the purpose of illustration, it will be apparent to those skilled in the art that the invention is susceptible to additional embodiments and that certain of the details described herein can be varied considerably without departing from the basic principles of this invention.

What is claimed is:

1. An apparatus for transporting a payload along an inside of a substantially horizontal pipe, the apparatus comprising:
   one and only one contactor means for contacting an inside pipe wall of said substantially horizontal pipe, said contactor means consisting of substantially vertically aligned and spaced apart rollable upper tracking contactor and lower pipe tracking contactor, each said pipe tracking contactor consisting of one wheel or one ball;
   relational pivot means for pivotably connecting said upper pipe tracking contactor with said lower pipe tracking contactor; and
   two-dimensional stabilization means for maintaining said upper and lower pipe tracking contactors in substantially vertical alignment as said apparatus travels inside said pipe.

2. The apparatus of claim 1, wherein said relational pivot means comprises at least one bevel gear assembly aligned to provide relational pivoting of said upper and lower pipe tracking contactors, whereby pivoting of one of said pipe contactors in a first direction results in pivoting of the other pipe tracking contactor in a direction opposite to said first direction.

3. The apparatus of claim 1, wherein said two-dimensional stabilization means comprises a variable speed drive motor operably connected with one of said upper pipe tracking contactor and said lower pipe tracking contactor.

4. The apparatus of claim 1, wherein said two-dimensional stabilization means comprises at least one two-dimensional tilt sensor mounted on said apparatus to sense deviation of said upper and lower pipe tracking contactors from said vertical alignment.

5. The apparatus of claim 2, wherein said two-dimensional stabilization means comprises a gear drive motor operably connected with said bevel gear assembly.

6. The apparatus of claim 1, wherein said two-dimensional stabilization means comprises a first variable speed motor operably connected with said upper pipe tracking contactor and a second variable speed motor operably connected with said lower pipe tracking contactor.

7. The apparatus of claim 6, wherein said two-dimensional stabilization means comprises a gear drive motor operably connected with said bevel gear assembly.

8. The apparatus of claim 4, wherein said two-dimensional stabilization means comprises a controller mounted on said apparatus, said controller controlling a speed of at least one of said upper pipe tracking contactor and said lower pipe tracking contactor based on information provided from said two-dimensional tilt sensor to said controller.

9. The apparatus of claim 1 further comprising contact means for maintaining contact between each of said upper and lower pipe tracking contactors and said pipe.

10. The apparatus of Claim 9, wherein said relational pivot means comprises an intermediate connecting element disposed between said upper and lower pipe tracking contactors and connecting said upper pipe tracking contactor with said lower pipe tracking contactor.

11. The apparatus of claim 2, wherein said at least one bevel gear assembly comprises an upper half, a lower half and an intermediate connecting element between said upper half and said lower half, said intermediate connecting element pivotably connected with said upper half and said lower half.

12. The apparatus of Claim 11, wherein said upper pipe tracking contactor is vertically pivotably connected with said upper half of said bevel gear assembly and said lower pipe tracking contactor is vertically pivotably connected with said lower half of said bevel gear assembly.

13. The apparatus of claim 12 further comprising force means for applying a force on each contactor to maintain continuous contact between said contactors and said pipe.

14. The apparatus of claim 13, wherein said force means comprises spring-loaded connections between said upper half of said bevel gear assembly and said upper pipe tracking contactor and between said lower half of said bevel gear and said lower pipe tracking contactor.

15. An apparatus for transporting a payload along an inside of a substantially horizontal pipe, the apparatus comprising:
   one and only one pipe tracking contactor means for contacting an inside wall of said substantially horizontal pipe, said pipe tracking contactor means consisting of a rollable upper pipe tracking contactor and a rollable lower pipe tracking contactor, each said pipe tracking contactor consisting of one wheel or one ball, said rollable upper pipe tracking contactor relationally pivotably connected with a vertically aligned said rollable lower pipe tracking contactor, whereby pivoting of said upper pipe tracking contactor in a first direction results in pivoting of said lower pipe tracking contactor in a direction opposite to said first direction; and
   control means for maintaining a vertical alignment of said upper and lower pipe tracking contactors.

16. The apparatus of claim 15, wherein said control means comprises a two-dimensional tilt sensor mounted on said apparatus to sense deviation of said upper and lower pipe tracking contactors from said vertical alignment.

17. The apparatus of claim 15, wherein said control means comprises a variable speed drive motor operably connected with at least one of said upper and lower pipe tracking contactors.

18. The apparatus of claim 17, wherein said pipe tracking contactors are connected by a bevel gear assembly comprising a passive upper bevel gear connected with said upper pipe tracking contactor, a passive lower bevel gear connected with said lower pipe tracking contactor, and a drive bevel gear meshing with each said passive bevel gear.

19. The apparatus of claim 18, wherein said control means further comprises a gear drive motor operably connected with said drive bevel gear.

* * * * *